United States Patent [19]
Palmgren

[11] 3,822,552
[45] July 9, 1974

[54] PIPE CONFIGURATION FOR HOT GAS ENGINE

[75] Inventor: Jan Ragnar Palmgren, Malmo, Sweden

[73] Assignee: Kommanditbolaget United Stirling (Sweden) AB & Co., Malmo, Sweden

[22] Filed: Mar. 15, 1973

[21] Appl. No.: 341,378

[30] Foreign Application Priority Data
Apr. 27, 1972   Great Britain.................. 19509/72

[52] U.S. Cl. .............................................. 60/517
[51] Int. Cl. .............................................. F02g 1/04
[58] Field of Search .................... 60/24, 517, 526, 1

[56] References Cited
UNITED STATES PATENTS
2,616,248   11/1952   De Brey et al.......................... 60/24
2,959,019   11/1960   Meijer................................... 60/24
3,237,847   3/1966    Wilson.................................. 60/24

FOREIGN PATENTS OR APPLICATIONS
1,092,779   4/1955   France.................................. 60/24

Primary Examiner—Edgar W. Geoghegan
Assistant Examiner—H. Burks
Attorney, Agent, or Firm—Laurence R. Brown

[57] ABSTRACT

A Stirling cycle type hot gas engine passes working gas from cylinders to regenerators through pipes which are exposed to heated combustion gases. These pipes are arcuately shaped and disposed with centers along a common horizontal straight line to permit placing a combustion chamber at the end for directing the combustion gases along the line.

7 Claims, 8 Drawing Figures

PATENTED JUL 9 1974　　3,822,552

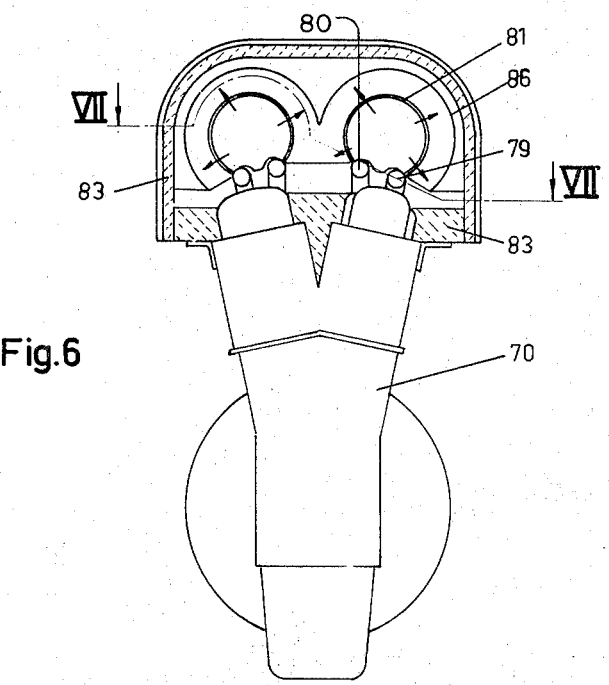
Fig.6
Fig.8
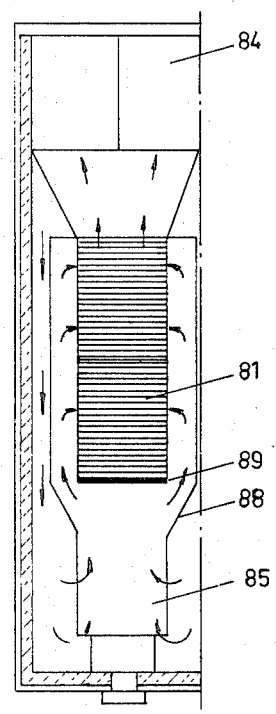
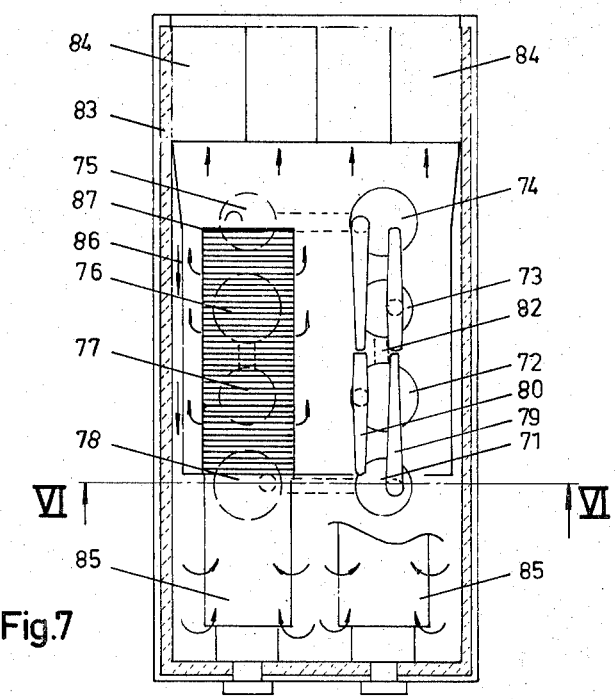
Fig.7

PIPE CONFIGURATION FOR HOT GAS ENGINE

This invention relates to multi-cylinder hot gas engines of the type in which heat is supplied to charges of working gas through pipes connecting the cylinders with regenerators.

One object of the present invention is to provide a hot gas engine of the type referred to above in which the pipes connecting the cylinders with the regenerators can be manufactured in an efficient way and in which said pipes are allowed to expand and contract with changing temperatures without causing excessive stresses. It is also an object of the invention to obtain a hot gas engine in which a large number of pipes may be arranged in a manner which does not require substantial increases in the outer dimensions of the engine.

According to the present invention there is provided a multi-cylinder hot gas engine of the type in which heat is supplied to charges of working gas through pipes connecting the cylinders with regenerators, characterized in that said pipes are arcuately shaped and are in groups in each of which the pipes are disposed in parallel vertical planes and have their centers of curvature disposed along a common horizontal straight line.

How the invention may be put into practice is described in more detail with reference to the accompanying drawings, in which:

FIG. 6 is a vertical section along the line VI—VI of FIG. 7 showing schematically a third embodiment of a hot gas engine according to the invention;

FIG. 7 is a section along the line VII—VII of FIG. 6; and

FIG. 8 is a part section corresponding to FIG. 7 of still another embodiment of a hot gas engine according to the invention.

Figure 1:
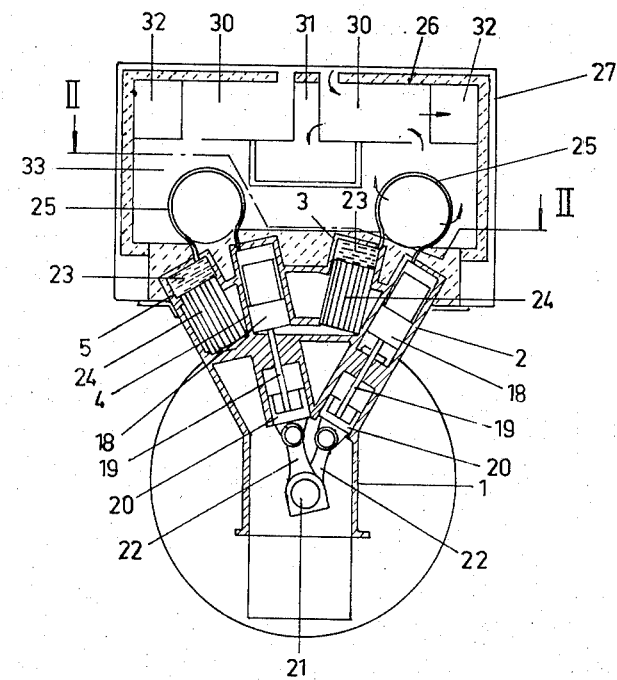
FIG. 1 is a vertical section along the line I—I of FIG. 2 showing schematically an embodiment of a hot gas engine according to the invention.
Figure 2:
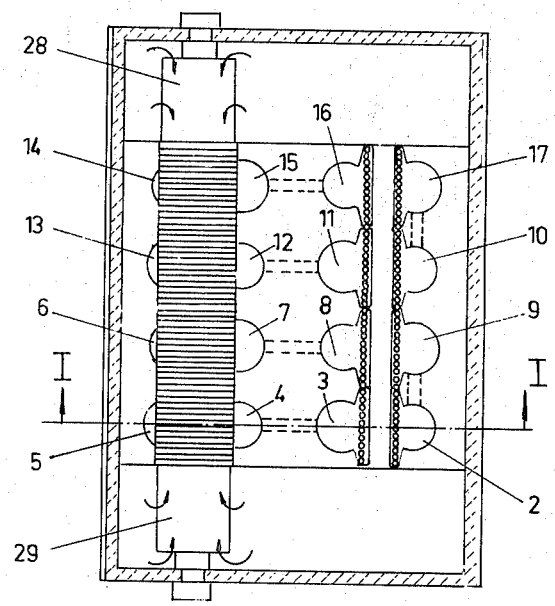
FIG. 2 is a section along the line II—II of FIG. 1.

Referring first to the embodiment shown in FIGS. 1 and 2, a housing 1 is provided with eight cylinders 2, 4, 6, 8, 10, 12, 14 and 16 and eight regenerator-cooler units 3, 5, 7, 9, 11, 13, 15 and 17. As shown in FIG. 1 the cylinders 2 and 4 each contain a piston 18 with a piston rod 19 guided by a crosshead 20 and acting upon a common crank-shaft 21 through connecting rods 22.

The regenerator-cooler units 3 and 5 (as well as all the other regenerator-cooler units) each contain a regenerator 23 coupled in series with a cooler 24. The interior upper part of the cylinder 2 (above the piston 18) is connected to the regenerator 23 of the unit 3 by arcuately shaped pipes 25 which are disposed in parallel vertical planes, and have their centers of curvature disposed along a common horizontal straight line. Likewise pipes 25 of similar shapes are disposed in similar manner and connect the cylinders 8, 10 and 16 with the units 9, 11 and 17 respectively. Similarly the cylinders 4, 6, 12 and 14 are connected by pipes 25 with the units 5, 7, 13 and 15, the latter pipes 25 forming a separate row.

The pipes 25 are arranged in a chamber which is partially limited by insulated walls 26, a shroud 27 surrounding the top of the engine. Burners 28 and 29 are arranged at each end of each of the rows of pipes 25. The chamber limited by the walls 26 is subdivided so as to form heat-exchangers 30 (not shown in detail), an exhaust flue 31, delivery ducts 32 for preheated air, and a combustion chamber 33.

The device described and shown in FIGS. 1 and 2 will operate as follows:

Air for combustion is supplied to the space between the shroud 27 and the wall 26, the air following the path indicated by arrows in FIG. 1. The air will enter the heat-exchanger 30 and the heated air will pass to a delivery duct 32 leading to one of the four (of which only two are shown) burners 28 and 29. The air is used for combustion of oil, and the combustion gases will pass axially through the spaces partly surrounded by the pipes 25. The combustion gases will pass between the said pipes 25 while giving off heat to the pipes 25 and will then pass to the heat-exchangers 30 in which more heat is withdrawn and used for heating the combustion air.

The cooled exhaust gases will leave the engine through the exhaust flue 31.

The pipes 25 contain working gas, for example helium or hydrogen. The gas in the cylinder 2 above the piston will form a separate charge together with the gas in the cylinder 4 below the piston and the gas in the connections including the regenerator-cooler unit 3.

Likewise the gas above the piston in cylinder 4 will form a charge together with the gas below the piston in the cylinder 6. The gas above the piston in cylinder 6 is connected to the gas below the piston in the cylinder 8, and the gas above the piston in cylinder 8 is connected to the gas below the piston of the cylinder 2.

The four separate charges, kept apart by the pistons of the cylinders 2, 4, 6 and 8, will each be cyclically compressed, heated, expanded and cooled. As the compression is carried out at low temperature and the expansion at high temperature useful work is obtained, as for example in the well known Stirling cycle. The cylinders 10, 12, 14 and 16 likewise contain four other working gas charges.

It will be understood that the pipes 25 could be of equal size and shape and they will not be exposed to excessive stresses when heated or cooled off. The lengths of the pipes 25, the diameters of the pipes and the number of pipes may be varied within comparatively wide limits. The construction comprising burners giving off combustion gases in the horizontal direction is very compact, especially when several burners are required.

Figure 3:
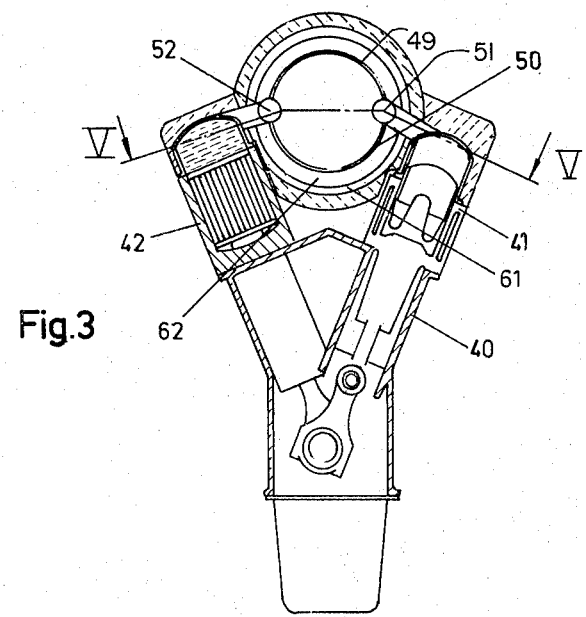
FIG. 3 is a vertical section along the line III—III of FIG. 5 showing another embodiment of an engine according to the invention.
Figure 4:
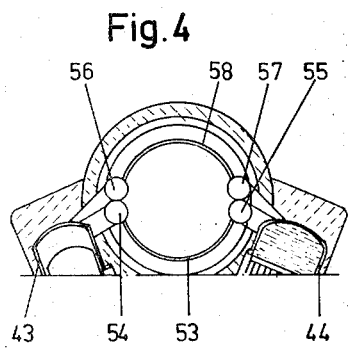
FIG. 4 is a part of a vertical section along the line IV—IV of FIG. 5.
Figure 5:
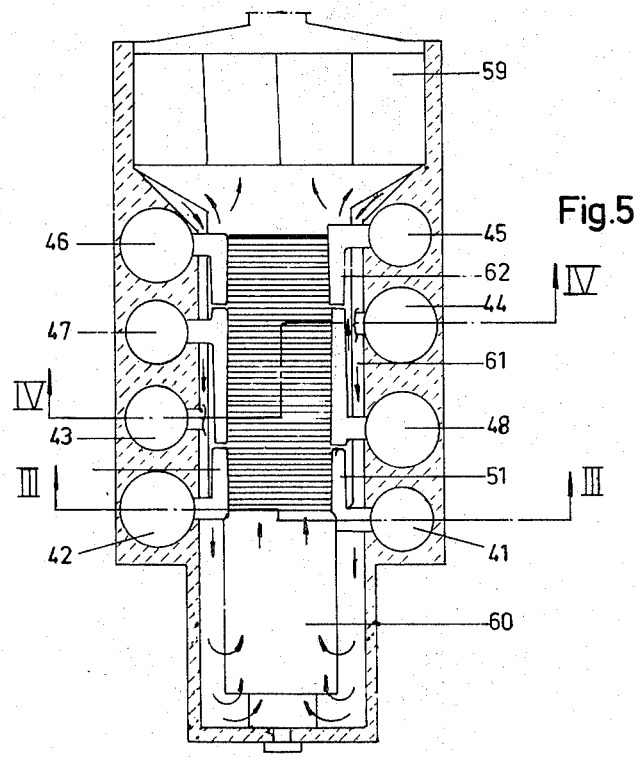
FIG. 5 is a section along the line V—V of FIG. 3.

The embodiment shown in FIGS. 3, 4 and 5 comprises a housing 40 having four cylinders 41, 43, 45 and 47 and four regenerator-cooler units 42, 44, 46 and 48. The engine has four gas charges separated by the pistons in the cylinders. Thus the gas above the piston in the cylinder 41 will form a separate charge together with the gas below the piston in the cylinder 43 and the gas in the connections including the half-circular pipes 49 and 50 extending from manifolds 51 and 52 connected to the cylinder 41 and the unit 42 respectively. The pipes 49 and 50 are all connected in parallel between the manifolds 51 and 52.

As shown in FIGS. 4 and 5, the connection between the top of the cylinder 43 and the unit 44 is established through pipes 53 extending between manifolds 54 and 55 connected to the cylinder 43 and the unit 44 respectively. The said pipes 53 are half-circular and are all concave as viewed from above. The manifolds 56 and 57 are connected to the cylinder 47 and the unit 48 respectively. They are interconnected by pipes 58, all being convex as viewed from above. The cylinder 45 and the unit 46 are interconnected in the same way as the cylinder 41 and the unit 42.

The devices shown in FIGS. 3, 4 and 5 comprises a heat-exchanger 59 from which pre-heated air is fed to a burner 60 through a passage 61. The combustion gases produced in the burner 60 are delivered to a tunnel-like space in which further combustion may take place and which is partly limited by the pipes 49, 50, 53 and 58. The combustion gases will pass radially between the said pipes to a passage 62 leading to the heat-exchanger 59.

The operation of the device according to the FIGS. 3, 4 and 5 is basically the same as that of the device according to FIGS. 1 and 2 and will thus not need any detailed explanation.

The special advantage of the design shown in FIGS. 3, 4 and 5 is that it allows the use of a single very large combustion chamber having a single burner.

The embodiment shown in FIGS. 6 and 7 comprises a housing 70 having four cylinders 71, 73, 75 and 77 and four regenerator-cooler units 72, 74, 76 and 78. The top of the cylinder 71 is provided with a horizontally-extending manifold 79, and the unit 72 is provided with a manifold 80, the said two manifolds being interconnected by a number of equally shaped substantially circular pipes 81. The lower end of the unit 72 is connected to the lower end of the cylinder 73 through a cold gas connecting duct 82. The top of the cylinder 73 is connected to the top of the unit 74 in the same way as the connection between the cylinder 71 and the unit 72. Also the remaining cylinders and regenerator-cooler units are interconnected in the same way.

Insulated walls 83 surround the upper part of the engine and limit a space containing the upper part of the cylinders and regenerator units as well as the circular pipes 81. Said space also contains pre-heaters 84 for pre-heating combustion air by means of exhaust gases and two burner units 85. A partition wall 86 is used for separating flow of air for combustion and combustion gases.

The engine shown in FIGS. 6 and 7 will operate as follows:

Air for the combustion is delivered to the heat-exchangers 84 from which it is passed to the burner units 85 while being guided between the walls 83 and 86. The combustion gases developed in the burners 85 will be passed horizontally in the direction towards the pre-heaters 84, but will gradually be passed through the slots formed between the pipes 81 as shown by the arrows in FIG. 6. A disc-shaped end wall 87 will prevent the hot combustion gases from passing directly to the heat-exchangers 84 and the combustion gases will therefore give off a substantial part of their heat to the pipes 81, which are cooled internally by the working gas of the hot gas engine.

The embodiment of FIG. 8 is similar to the one described and shown with reference to FIGS. 6 and 7 except for the guiding of the combustion gases. The gases will pass from the burner unit 85 between the slots formed by the pipes 81 in the direction from the outside and radially inwards. The gases will then pass in the axial direction towards the heat-exchangers 84. This flow of gases is obtained by a suitable partition wall 88 and by a disc-shaped end wall 89.

The advantage obtained by the constructions according to FIGS. 6 and 7 and to FIG. 8 is primarily the possibility of using efficiently an available rather long and narrow space.

Each of the illustrated engines is of the double-acting type having at least four cylinders disposed in a V with pistons working through piston rods on a single crank-shaft, comprising two burners producing combustion gases giving off heat by passing between the pipes connecting the cylinders with the regenerators, these pipes being at the boundaries of one or two cylindrical tunnel-like spaces, in which some combustion may take place.

In FIGS. 1 and 6 the said tunnel-like spaces are two in number and are parallel to each other. In each of the engines said pipes connecting the cylinders and the regenerators extend over an arc of between 150° and 180° and extend upwards and downwards from horizontally extending manifolds, and it can be seen that said manifolds in each pair contain gas belonging to separate working gas charges.

What is claimed is:

1. A multi-cylinder hot gas engine of the type in which heat is supplied to charges of working gas through pipes connecting the cylinders with regenerators, characterized in that said pipes are arcuately shaped and are in rows or groups in each of which the pipes are identical and disposed in parallel vertical planes and have their centers of curvature disposed along a common horizontal straight line and including means passing combustion gases unidirectionally following said straight line.

2. A hot gas engine according to claim 1 and of the double-acting type having at least four cylinders disposed in a V with pistons working through piston rods on a single crank-shaft, comprising two burners producing combustion gases giving off heat by passing between the pipes connecting the cylinders with the regenerators, these pipes being at the boundaries of one or two cylindrical tunnel-like spaces.

3. A hot gas engine according to claim 2, wherein the said tunnel-like spaces are two in number and are parallel to each other.

4. A hot gas engine according to claim 1, characterized in that said pipes connecting the cylinders and the regenerators extend over an arc of between 150° and 180° and extend upwards and downwards from horizontally extending manifolds.

5. A hot gas engine according to claim 4, characterized in that said manifolds are arranged in pairs and that the manifolds in each pair contain gas belonging to separate working gas charges.

6. A hot gas engine comprising a plurality of cylinders, associated regenerators for each cylinder and pipes passing working gas between each cylinder to its regenerator, characterized in that all said pipes are arcuately shaped and placed in at least one row having a common center passageway defined by the centers of the arcuate shape and extending along a linear path, and combustion chamber means disposed to direct combustion gases along said path through said passageways.

7. An engine as defined in claim 6, wherein the pipes are all confined in a single row with the linear path constituting a straight line and the combustion chamber means comprises a single burner disposed at one end of the passageway.

* * * * *